(12) United States Patent
Savir et al.

(10) Patent No.: US 12,014,064 B2
(45) Date of Patent: Jun. 18, 2024

(54) MAPPING STORAGE VOLUMES TO STORAGE PROCESSING NODES USING INPUT/OUTPUT OPERATION CONSTRAINTS AND DESIGNATED FUNCTION

(71) Applicant: EMC IP Holding Company LLC, Hopkinton, MA (US)

(72) Inventors: Amihai Savir, Sansana (IL); Avitan Gefen, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 17/186,773

(22) Filed: Feb. 26, 2021

(65) Prior Publication Data
US 2022/0276800 A1 Sep. 1, 2022

(51) Int. Cl.
*G06F 3/06* (2006.01)
(52) U.S. Cl.
CPC .......... *G06F 3/0644* (2013.01); *G06F 3/0604* (2013.01); *G06F 3/0659* (2013.01); *G06F 3/0673* (2013.01)
(58) Field of Classification Search
None
See application file for complete search history.

(56) References Cited

U.S. PATENT DOCUMENTS

| 10,581,959 | B2 * | 3/2020 | Ambach | H04L 67/1029 |
| 11,140,219 | B1 * | 10/2021 | Cady | H04L 67/1012 |
| 2005/0259632 | A1 * | 11/2005 | Malpani | H04L 67/101 |
| | | | | 370/351 |
| 2008/0201719 | A1 * | 8/2008 | Daniel | H04L 47/283 |
| | | | | 718/105 |
| 2012/0191912 | A1 * | 7/2012 | Kadatch | G06F 11/1076 |
| | | | | 711/119 |

(Continued)

OTHER PUBLICATIONS https://docs.bmc.com/docs/display/Configipedia/Dell+Compellent+Storage+Discovered+Information, downloaded on Jan. 25, 2021.

(Continued)

*Primary Examiner* — Prasith Thammavong
*Assistant Examiner* — Edmund H Kwong
(74) *Attorney, Agent, or Firm* — Ryan, Mason & Lewis, LLP

(57) ABSTRACT

Techniques are provided for mapping storage volumes to storage processing nodes in a storage system. One method comprises determining a number of input/output operations associated with each of multiple storage volumes, wherein the input/output operations associated with a given storage volume are processed by a corresponding storage processing node based on a mapping of the storage volumes to the storage processing nodes; obtaining constraints that limit the input/output operations processed by at least a subset of the storage processing nodes; identifying at least one possible mapping of the storage volumes to the storage processing nodes that satisfy the constraints; and selecting an alternative mapping of the storage volumes to the storage processing nodes by applying a designated function to the at least one possible mapping. The input/output operations may comprise read operations and write operations, and the read and write operations may be balanced separately.

20 Claims, 9 Drawing Sheets

(56) References Cited

U.S. PATENT DOCUMENTS

| | | | |
|---|---|---|---|
| 2017/0222935 A1* | 8/2017 | Kalman | H04L 43/0888 |
| 2018/0267728 A1* | 9/2018 | Booth | G06F 11/3034 |
| 2018/0321861 A1* | 11/2018 | Rao | G06F 3/0665 |
| 2019/0102093 A1* | 4/2019 | Parnell | G06F 11/2007 |
| 2021/0105322 A1* | 4/2021 | Sakashita | H04L 41/5019 |

OTHER PUBLICATIONS https://www.dell.com/downloads/global/power/ps4q04-20040149-Mehis.pdf, downloaded on Jan. 28, 2021.
https://www.delltechnologies.com/en-us/collaterals/unauth/white-papers/products/storage/h18149-dell-emc-powerstore-platform-introduction.pdf, downloaded on Jan. 28, 2021.

* cited by examiner

MINIMIZE COST FUNCTION 410:
$CX = xor(c_1 v_1) + xor(c_2 v_2) + \cdots + xor(c_n v_n)$

SUBJECT TO CONSTRAINTS 420:

$$r_1 v_1 + r_2 v_2 + \cdots + r_n v_n \leq \frac{r_{high}(r_1 + r_2 + \cdots r_n)}{100}$$

$$r_1 v_1 + r_2 v_2 + \cdots + r_n v_n \geq \frac{r_{low}(r_1 + r_2 + \cdots r_n)}{100}$$

$$w_1 v_1 + w_2 v_2 + \cdots + w_n v_n \leq \frac{W_{high}(w_1 + w_2 + \cdots w_n)}{100}$$

$$w_1 v_1 + w_2 v_2 + \cdots + w_n v_n \geq \frac{W_{low}(w_1 + w_2 + \cdots w_n)}{100}$$

DEFINITIONS 430:

$r_i$ – number of read operations on volume $i$
$w_i$ – number of write operations on volume $i$
$r_{high}$ and $r_{low}$ – valid reading balance boundaries (%)
$W_{high}$ and $W_{low}$ – valid write balance bounderies (%)
$c_i$ – equals 1 if volume $i$ is mapped to node 1, and equals 0 if volume $i$ is mapped to node 2
$v_i$ – equals 1 if volume $i$ is mapped to node 1, and equals 0 if volume $i$ is mapped to node 2

FIG. 4

MAPPING STORAGE VOLUMES TO STORAGE PROCESSING NODES USING INPUT/OUTPUT OPERATION CONSTRAINTS AND DESIGNATED FUNCTION

FIELD

The field relates generally to information processing systems, and more particularly to storage in such systems.

BACKGROUND

Input/output operations (e.g., read and write operations) associated with a storage volume within a storage system are processed by a storage processing node. When there are multiple storage processing nodes in a storage system, a performance of the storage system can be impacted by the number of input/output operations processed by each storage processing node. For example, when the numbers of input/output operations processed by different storage processing nodes in a storage system are imbalanced, a performance degradation may be experienced.

A need exists for improved techniques for allocating the input/output operation processing load among multiple storage processing nodes.

SUMMARY

In one embodiment, a method comprises determining a number of input/output operations for a period of time associated with each of a plurality of storage volumes, wherein the input/output operations associated with a given one of the storage volumes are processed by a corresponding one of a plurality of storage processing nodes based on a current mapping of the plurality of storage volumes to respective ones of the plurality of storage processing nodes; obtaining a plurality of constraints that limit the input/output operations processed by at least a subset of the storage processing nodes; identifying one or more possible mappings of the plurality of storage volumes to respective ones of the plurality of storage processing nodes that satisfy the plurality of constraints; and selecting an alternative mapping of the plurality of storage volumes to respective ones of the plurality of storage processing nodes by applying at least one designated function to at least a subset of the one or more possible mappings.

In some embodiments, the input/output operations comprise a plurality of read operations and a plurality of write operations, and the plurality of read operations and the plurality of write operations are balanced separately among the storage volumes. For example, the plurality of constraints may comprise: (i) a first sum of the plurality of read operations being above a lower limit of a total number of read operations and below an upper limit of the total number of read operations, and (ii) a second sum of the plurality of write operations being above a lower limit of a total number of write operations and below an upper limit of the total number of write operations.

Other illustrative embodiments include, without limitation, apparatus, systems, methods and computer program products comprising processor-readable storage media.

BRIEF DESCRIPTION OF THE DRAWINGS

FIG. 4 illustrates an exemplary integer program to determine a mapping of storage volumes to storage processing nodes, according to some embodiments of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for mapping storage volumes to storage processing nodes in a storage system, for example, using integer programming techniques.

In one or more embodiments, techniques are provided for mapping storage volumes to storage processing nodes in a storage system based on a total number of input/output operations (e.g., read and write operations) handled by each storage processing node. The storage volumes can be moved from one storage processing node to another storage processing node using the disclosed techniques based on input/output operation statistics (e.g., the number of input/output operations in a recent time window) to ensure that the total number of input/output operations processed by each storage processing node is distributed uniformly among the available storage processing nodes.

In some embodiments, the read operations within the overall input/output operations are balanced separately from the write operations. For example, in a given storage system, the read operations and write operations may not be equally weighed and the total number of read operations are balanced separately from the total number of write operations using the disclosed techniques. It has been estimated, for example, that in some storage systems, the computational cost of processing a write operation may be twice the computational cost of processing a read operation.

Figure 1:
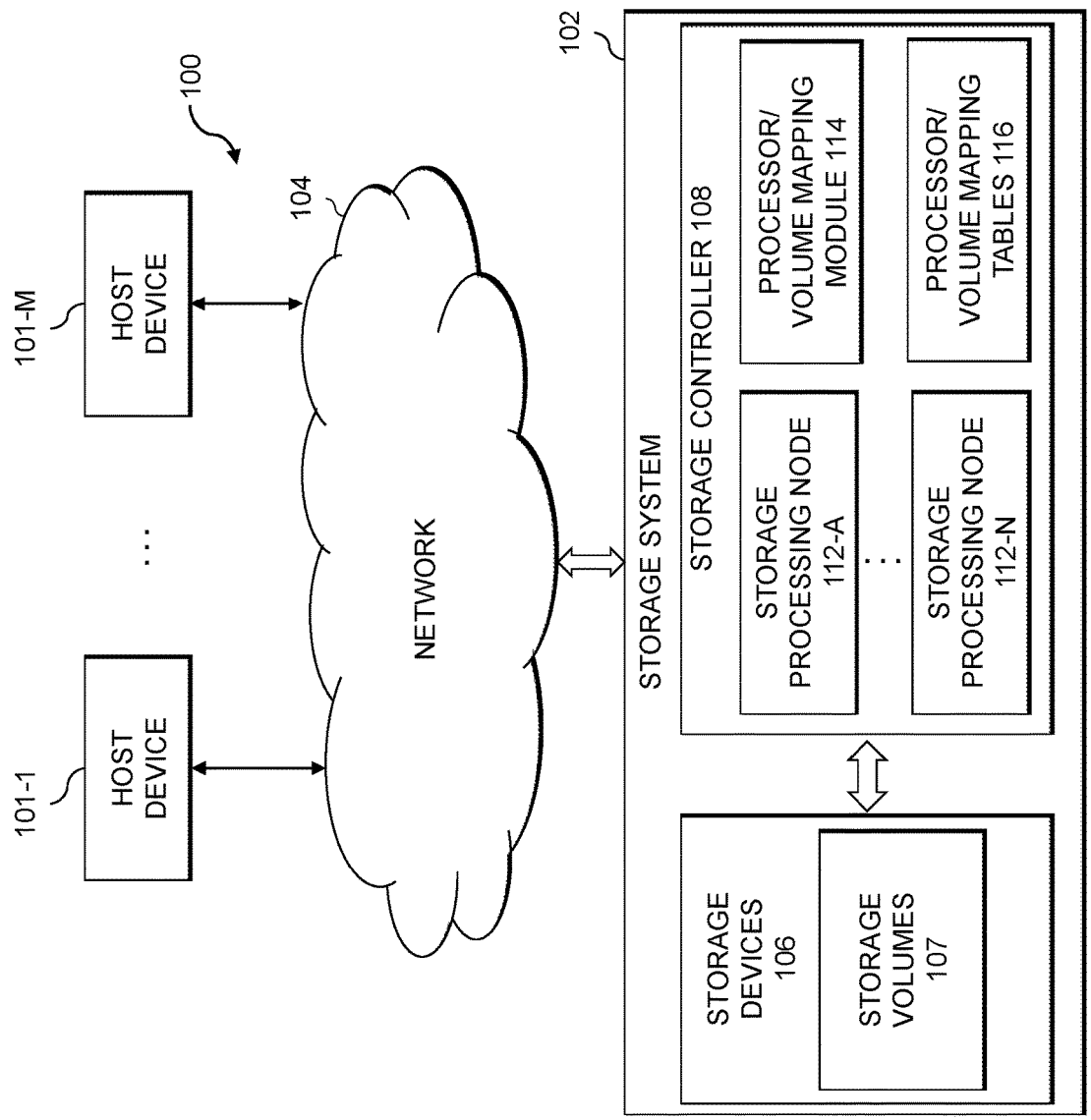
FIG. 1 illustrates an information processing system configured for mapping storage volumes to storage processing nodes in a storage system in accordance with an illustrative embodiment.

FIG. 1 shows an information processing system 100 configured in accordance with an illustrative embodiment. The information processing system 100 comprises a plurality of host devices 101-1 through 101-M, collectively referred to herein as host devices 101. The host devices 101 are configured to communicate with a storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the storage system 102. The term "input-output" as used herein refers to at least one of input and output. For example, IO operations may comprise write requests and/or read requests directed to logical addresses of a particular logical storage volume of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of a cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 and an associated storage controller 108. The storage devices 106 store data of a plurality of storage volumes 107. For example, the storage volumes 107 may illustratively comprise respective logical units (LUNs) or other types of logical storage volumes. It is noted that in the context of a Linux/Unix system, a volume relates to a Logical Volume Manager (LVM), which can be used to manage mass storage devices; a physical volume generally refers to a storage device or partition; and a logical volume is created by the LVM and is a logical storage device (e.g., a LUN) which can span multiple physical volumes. The term "storage volume" as used herein is intended to be broadly construed, and should not be viewed as being limited to any particular format or configuration.

The storage devices 106 of the storage system 102 illustratively comprise solid state drives (SSDs). Such SSDs are implemented using non-volatile memory (NVM) devices such as flash memory. Other types of NVM devices that can be used to implement at least a portion of the storage devices include non-volatile random access memory (NVRAM), phase-change RAM (PC-RAM), magnetic RAM (MRAM), resistive RAM, and spin torque transfer magneto-resistive RAM (STT-MRAM). These and various combinations of multiple different types of NVM devices may also be used. For example, hard disk drives (HDDs) can be used in combination with or in place of SSDs or other types of NVM devices in the storage system 102.

It is therefore to be appreciated numerous different types of storage devices 106 can be used in the storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as a storage array. A wide variety of other types of distributed or non-distributed storage arrays can be used in implementing the storage system 102 in other embodiments. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The MPIO driver may comprise, for example, an otherwise conventional MPIO driver. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The storage controller 108 of storage system 102 comprises a plurality of storage processing nodes 112-A through 112-N, a processor/volume mapping module 114 and one or more processor/volume mapping tables 116. In another variation, one or more of the storage processing nodes 112, processor/volume mapping module 114 and processor/volume mapping tables 116 may be implemented as distinct modules, separate from the storage controller 108. In at least some embodiments, the storage processing nodes 112 process at least some of the input/output operations associated with one or more of the storage volumes 107. The storage processing nodes 112 may be configured, for example, using a dual-node architecture that includes at least two identical storage processing nodes 112 for redundancy in an active/active controller configuration where the at least two identical storage processing nodes 112 are servicing input/output operations simultaneously.

In at least some embodiments, the storage processing nodes 112 comprise a boot module, a memory module, a network connectivity module and one or more IO modules. The boot module can store a base operating system and log files for the respective storage processing node 112, and can be used for general system operations. The memory module may comprise, for example, random access memory, such as one or more NVRAM. The network connectivity module supports network connectivity for one or more of data storage, management and service access, cluster communications, and other connectivity. During a node failure, matching IO modules can ensure that the peer node can begin servicing IOs using the mirrored IO module.

A separate processor/volume mapping table 116 may be associated in some embodiments with each storage processing node 112 and identify the storage volumes 107 that are currently mapped to the respective storage processing node 112. The processor/volume mapping tables 116 may be stored in memory or in a database in various implementations.

In one or more embodiments, each storage resource, such as each of storage volumes 107 is assigned to one of the storage processing nodes 112 for load balancing and redundancy purposes. If one storage processing node 112 becomes unavailable, the resources of the unavailable storage processing node automatically fail over to the surviving storage processing node. The peer storage processing node assumes ownership of the storage resources and continues servicing the input/output operations to avoid an extended outage.

Asymmetrical Logical Unit Access (ALUA) techniques may be implemented in some embodiments. For example, when a LUN is created, the LUN can be assigned to a particular storage processing node 112 that becomes the default owner of the new LUN. A set of paths can be created to the LUN, one through the owning storage processing node 112, sometimes referred to as the active/optimized path, and another through the peer storage processing node, sometimes referred to as the active/non-optimized path. ALUA techniques allow LUNs to be seen through paths of multiple storage processing nodes 112 but only the owning storage processing node processes the input/output operations of the particular assigned LUN. Host IOs that are received by the non-owning storage processing node are redirected to the owning storage processing node through lower layers of the software. If a path fails, such as a particular storage processing node fails, ALUA will route the input/output operations to the non-optimized path and re-route the input/output operations to the surviving storage processing node.

It is to be appreciated that this particular arrangement of module 114 and tables 116 illustrated in the storage controller 108 of the FIG. 1 embodiment is presented by way of example only, and alternative arrangements can be used in other embodiments. For example, the functionality associated with module 114 in other embodiments can be separated across a larger number of modules. As another example, multiple distinct processors can be used to implement module 114 or portions thereof. In addition, the storage controller 108 may further include one or more additional modules and other components typically found in conventional implementations of storage controllers and storage systems, although such additional modules and other components are omitted from FIG. 1 for clarity and simplicity of illustration.

At least portions of module 114 may be implemented at least in part in the form of software that is stored in memory and executed by a processor. An exemplary process utilizing module 114 of an example storage controller 108 in computer network 100 will be described in more detail with reference to, for example, FIGS. 4 and 5.

In some embodiments, the storage system 102 is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller of the storage system 102. For example, in some embodiments the sets of processing modules of the storage nodes collectively comprise a distributed storage controller of the storage system 102. A "distributed storage system" as that term is broadly used herein is intended to encompass any storage system that is distributed across multiple storage nodes.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102, or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers.

Additional examples of processing platforms utilized to implement host devices 101 and storage system 102 in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 101, storage system 102, and network 104 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

In one or more embodiments, cold start techniques or a random assignment may be employed to initially assign storage volumes to storage processing nodes. In addition, if prior knowledge is available regarding the usages of the storage volumes, it may be employed to help determine the initial assignment of storage volumes to storage processing nodes.

In at least some embodiments, the disclosed techniques for mapping storage volumes to storage processing nodes perform a mapping based on recent input/output operation statistics indicating the number of input/output operations and/or the number of separate read and write operations. The disclosed techniques are employed to remap the storage volumes to storage processing nodes to maintain a load balance among the storage processing nodes as the number of input/output operations handled by each storage volume vary over time.

Figure 2A:
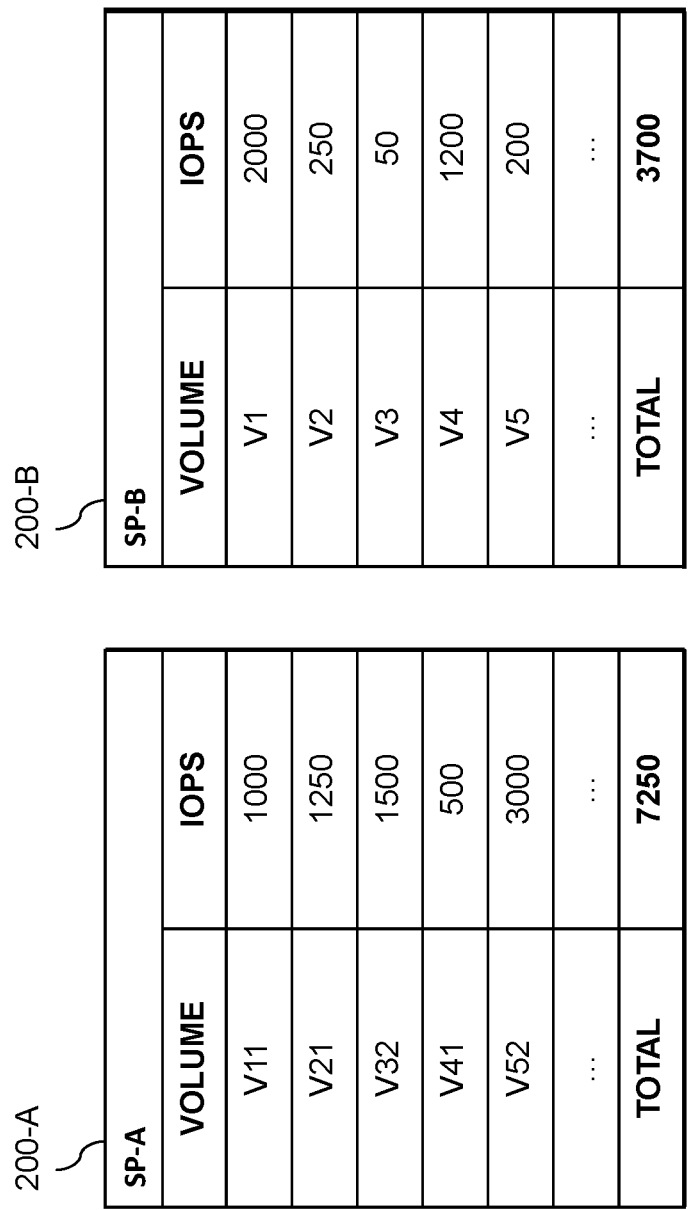
FIGS. 2A and 2B illustrate the processor/volume mapping tables of FIG. 1 before and after, respectively, a remapping is performed of the input/output operations of the storage volumes to the storage processing nodes of FIG. 1, according to an embodiment of the disclosure.

FIG. 2A illustrates the processor/volume mapping tables 116 of FIG. 1 in further detail for a pair of storage processing nodes 112, according to one embodiment. As noted above, each processor/volume mapping table 116 may be associated in some embodiments with a given storage processing node 112 and identify the storage volumes 107 that are currently mapped to the given storage processing node 112. In the example of FIG. 2A, a first storage processing node 112 (SP-A) is currently assigned to process the input/output operations (IOPs) of storage volumes V11, V21, V32, V41 and V52, as shown in the processor/volume mapping table 200-A. In addition, a second storage processing node 112 (SP-B) is currently assigned to process the input/output operations of storage volumes V1, V2, V3, V4 and V5, as shown in the processor/volume mapping table 200-B.

Based on the statistics shown in FIG. 2A, storage processing node SP-A is processing 7,250 input/output operations, while storage processing node SP-B is processing only 3,700 input/output operations. As noted above, the load imbalance among the storage processing nodes may lead to a performance degradation in the storage system.

Figure 2B:
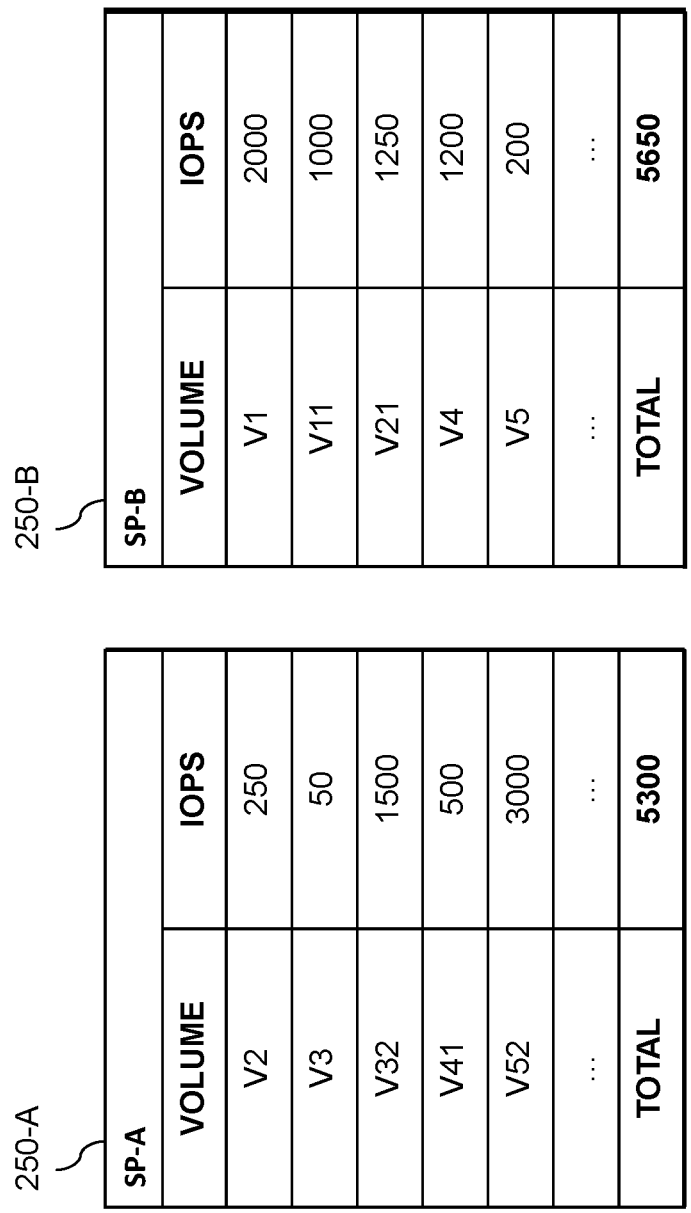

FIG. 2B illustrates the processor/volume mapping tables of FIG. 2A in further detail, after a remapping is performed of the input/output operations of the storage volumes SP-A and SP-B, according to an embodiment of the disclosure. In the example of FIG. 2B, the first storage processing node SP-A is reassigned to process the input/output operations of storage volumes V2, V3, V32, V41 and V52, as shown in the processor/volume mapping table 250-A. In addition, the second storage processing node SP-B is reassigned to process the input/output operations of storage volumes V1, V11, V21, V4 and V5, as shown in the processor/volume mapping table 250-B. Following the reassignment, storage processing node SP-A is processing 5,300 input/output operations, while storage processing node SP-B is processing 5,650 input/output operations, providing a more balanced configuration.

Figure 3A:
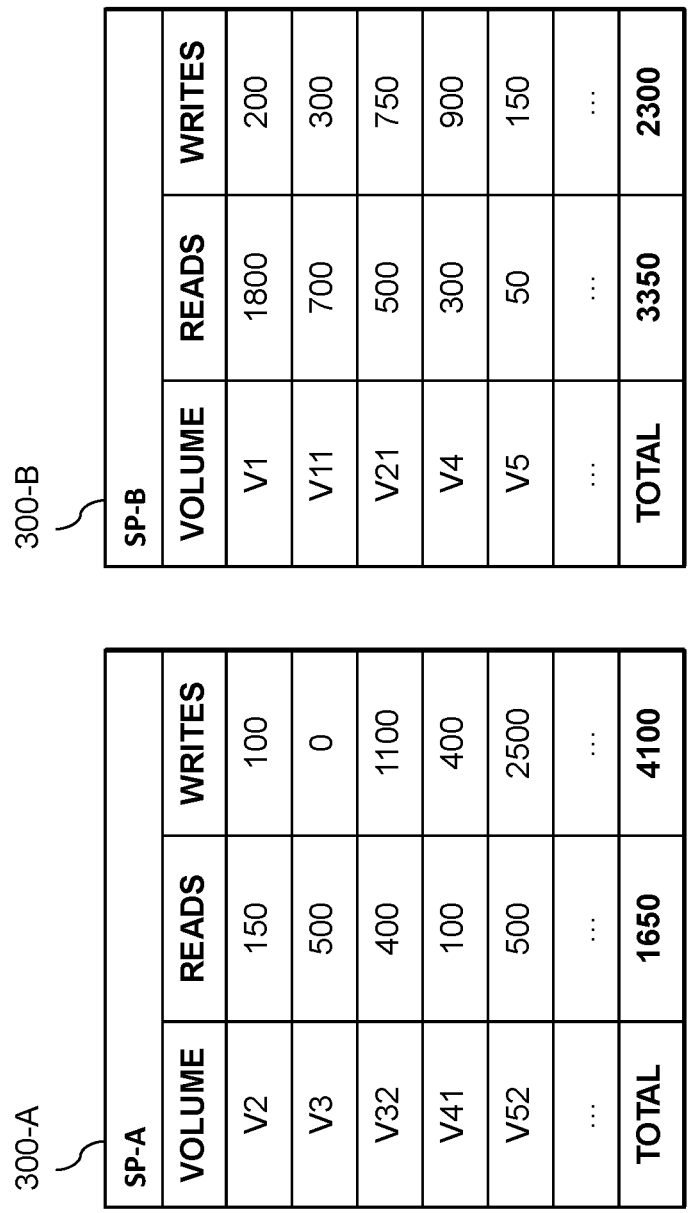
FIGS. 3A and 3B illustrate the processor/volume mapping tables of FIG. 1 before and after, respectively, a remapping is performed separately for the read and write operations of the storage volumes to the storage processing nodes of FIG. 1, according to at least one embodiment.

FIG. 3A illustrates the processor/volume mapping tables 116 of FIG. 1 in further detail for a pair of storage processing nodes 112, according to some embodiments of the disclosure where the mapping is performed separately for the read and write operations. It is noted that there is a dependency between read and write operations, as the read and write operations are referring to data that can be at the same volume.

In the example of FIG. 3A, storage processing node SP-A is currently assigned to process the input/output operations of storage volumes V2, V3, V32, V41 and V52, as shown in the processor/volume mapping table 300-A. In addition, the second storage processing node SP-B is currently assigned to process the input/output operations of storage volumes V1, V11, V21, V4 and V5, as shown in the processor/volume mapping table 300-B.

Based on the statistics shown in FIG. 3A, storage processing node SP-A is processing 1,650 read operations and 4,100 write operations, while storage processing node SP-B is processing 3,350 read operations and 2,300 write operations. One or more aspects of the disclosure recognize that even though the total number of input/output operations is relatively balanced across storage processing nodes SP-A and SP-B, the load imbalance among the read and write operations processed by the storage processing nodes may lead to a performance degradation in the storage system.

Figure 3B:
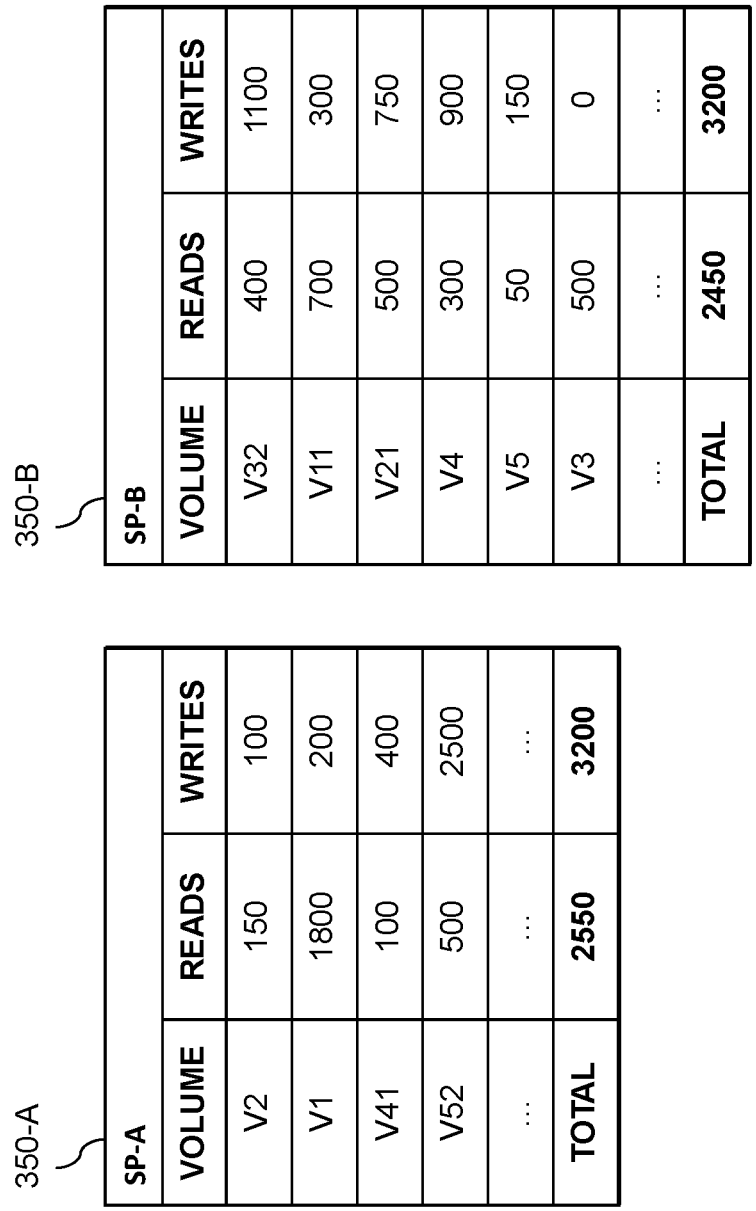

FIG. 3B illustrates the processor/volume mapping tables of FIG. 3A in further detail, after a remapping is separately performed of the read and write operations of the storage volumes SP-A and SP-B, according to an embodiment. In the example of FIG. 3B, the first storage processing node SP-A is reassigned to process the read and write operations of storage volumes V2, V1, V41 and V52, as shown in the processor/volume mapping table 350-A. In addition, the second storage processing node SP-B is reassigned to process the read and write operations of storage volumes V32, V11, V21, V4, V5 and V3, as shown in the processor/volume mapping table 350-B. Following the reassignment, storage processing node SP-A is processing 2,550 read operations and 3,200 write operations, while storage processing node SP-B is processing 2,450 read operations and 3,200 write operations, providing a more balanced configuration.

FIG. 4 illustrates an exemplary integer program 400 to determine a mapping of storage volumes 107 to storage processing nodes 112, according to some embodiments of the disclosure. An integer programming problem is often considered a mathematical optimization where some or all of the variables are restricted to be integers. As shown in FIG. 4, the exemplary integer program 400 comprises a cost function 410 to be substantially minimized (or substantially maximized in an alternate implementation), while at the same time satisfying a set of constraints 420.

Consider the following exemplary definitions 430 for the variables in the cost function 410 and/or the set of constraints 420:

$r_i$—number of read operations on volume i
$w_i$—number of write operations on volume i
$r_{high}$ and $r_{low}$—valid reading balance boundaries (%)
$w_{high}$ and $w_{low}$—valid write balance boundaries (%)
$c_i$—equals 1 if volume i is mapped to node 1, and equals 0 if volume i is mapped to node 2
$v_i$—equals 1 if volume i is mapped to node 1, and equals 0 if volume i is mapped to node 2.

In at least some embodiments, the number of read and write operations are based on a set of statistics over a recent window, such as a prior three-day window (and the iterative remapping process can be repeated, for example, on regular intervals and use a prior window of data). For example, in a storage system 102 having two storage processing nodes 112, it may be desired that each storage processing node processes 50% of the read operations and 50% of the write operations, with a permissible 10% deviation from the target percentage. Thus, $r_{high}$ and $r_{low}$, for example, may be set to 60% and 40%, respectively, to establish an acceptable range of 40-60% of the read operations handled by each storage processing node.

In one or more embodiments, the $r_{high}$ and $r_{low}$ values, as well as the $w_{high}$ and $w_{low}$ values, comprise constraints that limit the number of read and write operations, respectively, processed by each storage processing node (expressed, for example, as a permissible percentage range of the read and write operations processed by each storage processing node).

The variable, indicates the current volume assignment of the respective storage volume prior to the reassignment performed using the disclosed techniques (e.g., this variable indicates the current state of the storage volume-to-storage processing node mappings). The variable, $v_i$, on the other hand, indicates the volume assignments of the respective storage volume following the reassignment performed using the disclosed techniques (e.g., this variable indicates the new suggested state of the storage volume-to-storage processing node mappings to be evaluated against the cost function 410).

In the example of FIG. 4, the cost function 410 reduces a number of storage volumes that are mapped to a different storage processing node in the alternative mapping. In particular, the exemplary cost function 410 applies an exclusive or ("XOR") function for each storage volume to determine the number of storage volumes that are mapped to a different storage processing node in the alternative mapping. In the exemplary cost function 410 shown in FIG. 4, the exclusive or function applied to each ($c_i$, $v_i$) element in the equation will have a binary value of 1 if the associated volume has been remapped (e.g., $c_i \neq v_i$) and will have a binary value of 0 if the associated volume has not been remapped (e.g., $c_i = v_i$). Thus, the sum of these ($c_i$, $v_i$) elements will indicate the total number of storage volumes that are remapped in the current proposed mapping.

In another embodiment, a cost function can map the storage volumes to the storage processing nodes in a manner that reduces (e.g., substantially minimizes) a difference between a percentage of the total input/output operations processed by at least one storage processing node and a target percentage of the total input/output operations processed by at least one storage processing node. For example, in an implementation having two storage processing nodes, the target percentage of the total input/output operations may specify that each of the storage processing nodes process 50% of the input/output operations (or alternatively, 50% of the read operation and 50% of the write operations). In some embodiments, one or more time-based stopping criteria may be specified to limit the execution time of the integer program 400 of FIG. 4. For example, the one or more time-based stopping criteria may stop the search of solutions within a predefined time period and take a local minimum within the time window as the solution.

The integer program 400 of FIG. 4 will evaluate the different possible storage volume-to-storage processing node mappings (or at least a subset thereof, as noted above), identify the possible storage volume-to-storage processing node mappings that satisfy the constraints 420 (e.g., by evaluating the equations within the constraints 420 using the recent input/output operations statistics) and then evaluate the mappings that satisfy the constraints 420 against the cost function 410 to identify an alternative mapping. The exemplary integer program 400 of FIG. 4 can be implemented, for example, using a python package that supports the cost function 410 (e.g., provides an exclusive or function).

In addition, or alternatively, to the constraints 420 shown in the example of FIG. 4, the constraints may also specify any storage volumes that must be mapped to the same storage processing node as a collection of storage volumes.

In the exemplary constraints 420 shown in FIG. 4, n is the total number of storage volumes to be mapped. For example, the left side of the first equation in the constraints 420 is a sum of the read operations mapped to a first storage processing node (in an implementation having two storage processing nodes, as the load on the second storage processing node can be inferred from the load on the first storage processing node). In addition, the right side of the first equation in the constraints 420 also limits the sum to be below an upper limit set for the acceptable range of read operations handled by each storage processing node. Likewise, the left side of the second equation in the constraints 420 is again a sum of the read operations mapped to the first storage processing node, and the right side of the second equation in the constraints 420 limits the sum to be above a lower limit set for the acceptable range of read operations handled by each storage processing node. The third and fourth equations in the constraints 420 are similarly defined for the write operations, as would be apparent to a person of ordinary skill in the art.

In this manner, the exemplary constraints 420 comprise (i) a first sum of the plurality of read operations being above a lower limit of a total number of read operations and below an upper limit of the total number of read operations, and (ii) a second sum of the plurality of write operations being above a lower limit of a total number of write operations and below an upper limit of the total number of write operations. For implementations having more than two storage processing nodes, the constraints 420 can be updated to limit a sum of the read operations and/or write operations handled by each storage processing node to be within defined limits, as would be apparent to a person of ordinary skill in the art based on the present disclosure.

Figure 5:
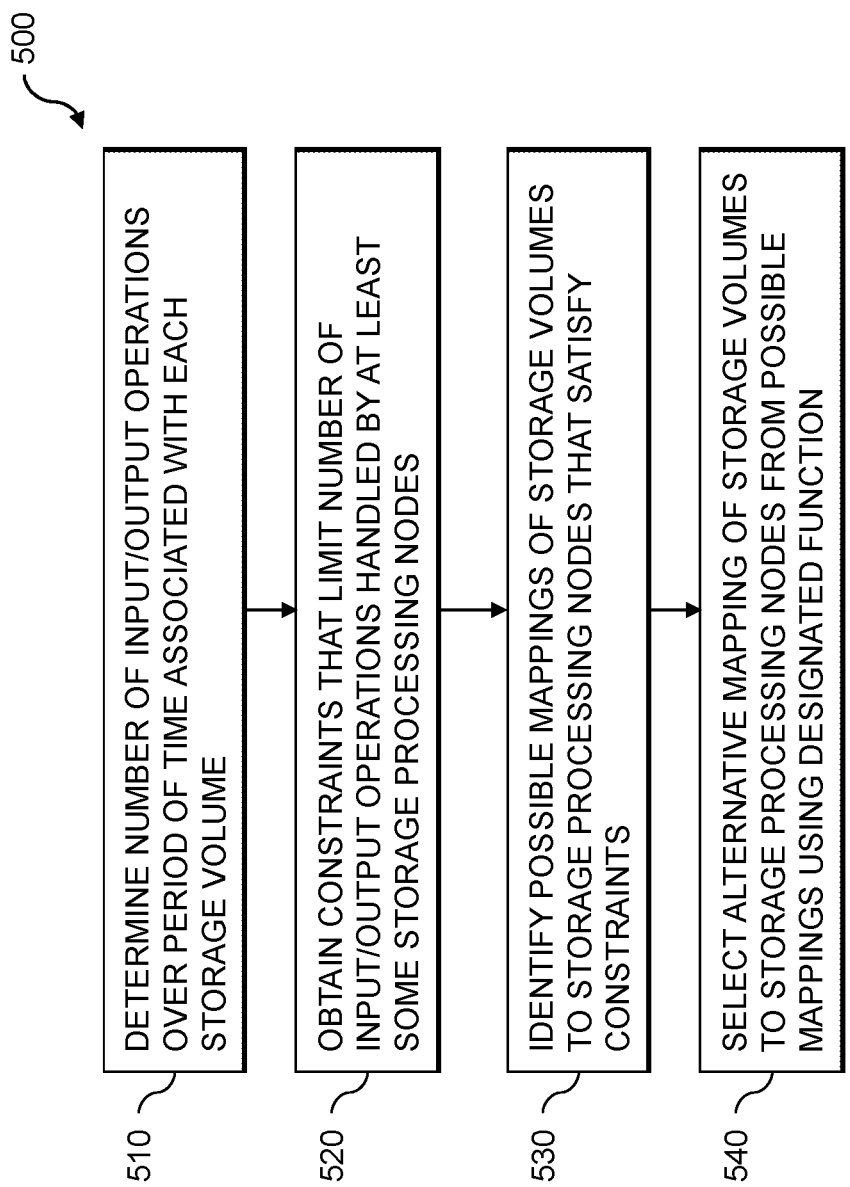
FIG. 5 is a flow diagram illustrating an exemplary implementation of a process for mapping storage volumes to storage processing nodes, according to at least some embodiments.

FIG. 5 is a flow diagram illustrating an exemplary implementation of a process 500 for mapping storage volumes to storage processing nodes, according to at least some embodiments. As shown in FIG. 5, the exemplary process 500 initially determines a number of input/output operations over a period of time associated with each storage volume, in step 510. Thereafter, constraints are obtained in step 520 that limit the number of input/output operations handled by at least a subset of the storage processing nodes and one or more possible mappings of storage volumes-to-storage processing nodes are identified in step 530 that satisfy the constraints.

Finally, an alternative mapping of storage volumes-to-storage processing nodes is selected in step 540 from the one or more possible mappings using a designated function (e.g., cost function 410). As noted above, in some embodiments, the cost function may reduce a number of storage volumes that are mapped to a different storage processing node in the alternative mapping (e.g., by applying an exclusive or function for each storage volume to determine the number of storage volumes that are mapped to the different storage processing node in the alternative mapping). In another variation, the cost function may comprise mapping the storage volumes to the storage processing nodes in a manner that reduces a difference between a percentage of the total input/output operations processed by at least one storage processing node and a target percentage of the total input/output operations processed by at least one storage processing node.

In some embodiments, the input/output operations comprise a plurality of read operations and a plurality of write operations, and the plurality of read operations and the plurality of write operations are balanced separately. For example, the plurality of constraints may comprise: (i) a first sum of the plurality of read operations being above a lower limit of a total number of read operations and below an upper limit of the total number of read operations, and (ii) a second sum of the plurality of write operations being above a lower limit of a total number of write operations and below an upper limit of the total number of write operations.

The particular processing operations and other network functionality described in conjunction with the flow diagram of FIG. 5 are presented by way of illustrative example only, and should not be construed as limiting the scope of the disclosure in any way. Alternative embodiments can use other types of processing operations to map storage volumes to storage processing nodes using the disclosed techniques. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the disclosed techniques for mapping storage volumes to storage processing nodes improve the performance of a storage system by balancing the load processed by the storage processing nodes in the storage system.

Among other benefits, the disclosed storage volume-to-storage processing node mapping techniques provide one or more solutions that satisfy a number of constrains and select a particular solution using one or more designated functions. In some embodiments, the storage volume mappings generated using the disclosed techniques are used to redirect input/output operations to the currently mapped storage processing node that implements the read and write functionality for a given storage volume.

As noted above, in some embodiments, the disclosed techniques for mapping storage volumes to storage processing nodes can be executed on a regular basis (e.g., once a week, or every other day) or triggered by another mechanism that measures the IO load balancing. The disclosed techniques will generate a list of volumes that should be mapped to each of the two storage processing nodes (e.g., compute nodes). This list of volumes will define the new volume mapping. Thus, the next time that a read or a write request arrives to the storage system, the controller will transfer the new IO request to the current node assigned to the associated storage volume by the alternative mapping. The storage volume-to-storage processing node mappings can be stored in a table and considered to be a dictionary that maps each storage volume to one storage processing node. Each execution of the integer program 400 of FIG. 4, for example, overrides the old dictionary.

One or more embodiments of the disclosure provide improved methods, apparatus and computer program products for mapping storage volumes to storage processing nodes. The foregoing applications and associated embodiments should be considered as illustrative only, and numerous other embodiments can be configured using the techniques disclosed herein, in a wide variety of different applications.

It should also be understood that the disclosed storage volume-to-storage processing node mapping techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for mapping storage volumes to storage processing nodes may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based storage volume-to-storage processing node mapping engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based storage volume-to-storage processing node mapping platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
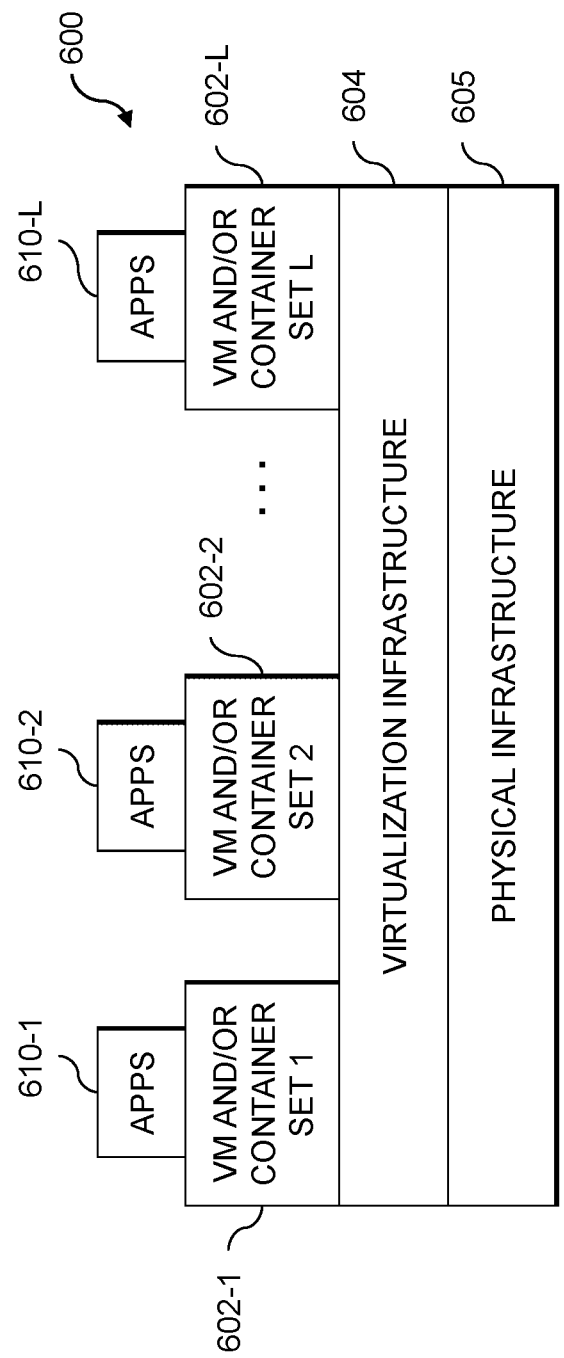
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide storage volume-to-storage processing node mapping functionality of the type described above for one or more processes running on a given one of the VMs. For example, each of the VMs can implement storage volume mapping control logic and associated mapping tables for providing storage volume-to-storage processing node mapping functionality for one or more processes running on that particular VM.

An example of a hypervisor platform that may be used to implement a hypervisor within the virtualization infrastructure 604 is a compute virtualization platform which may have an associated virtual infrastructure management system such as server management software. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide storage volume-to-storage processing node mapping functionality of the type described above for one or more processes running on different ones of the containers. For example, a container host device supporting multiple containers of one or more container sets can implement one or more instances of storage volume mapping control logic and associated mapping tables for use in mapping storage volumes to storage processing nodes.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
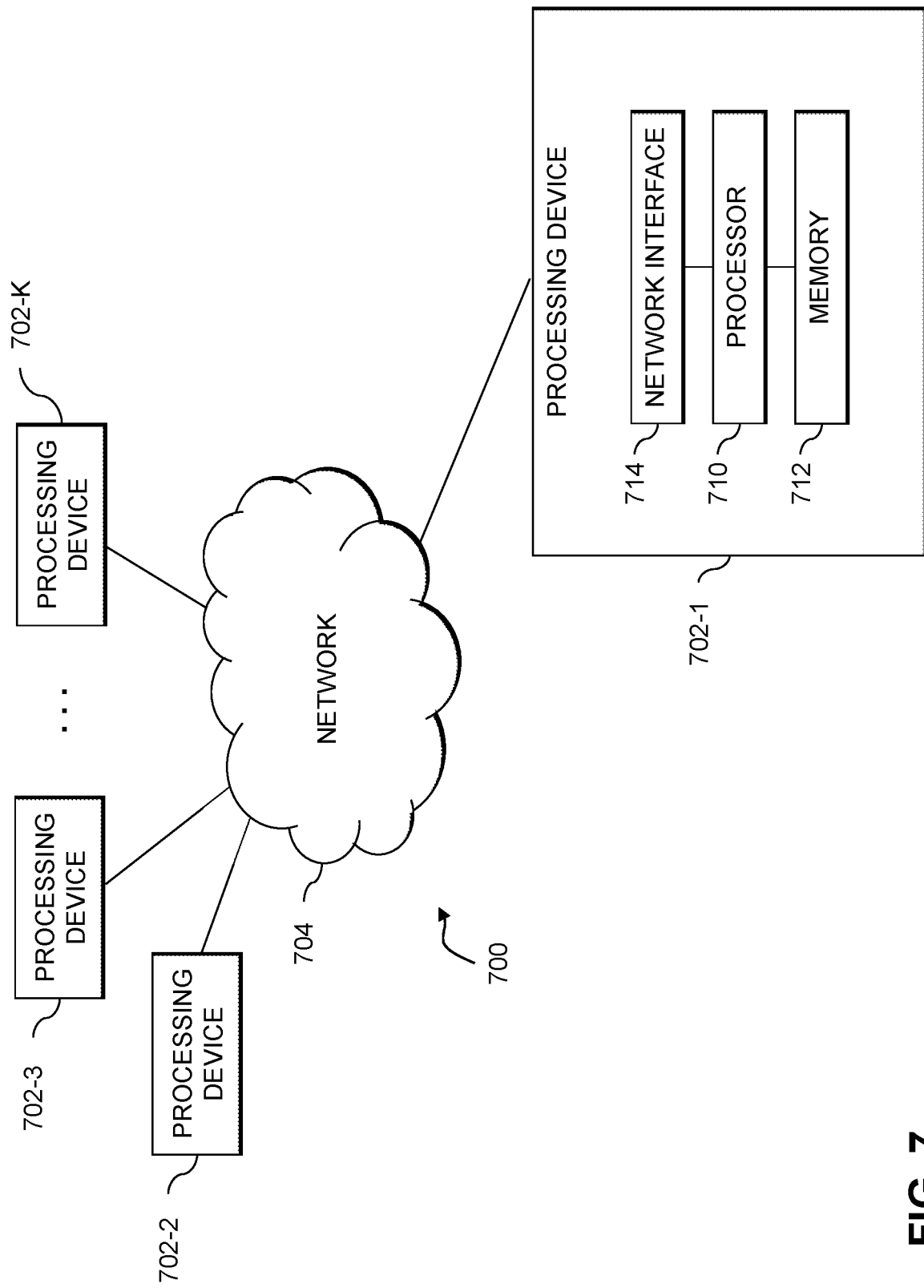
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
  determining a number of input/output operations for a period of time associated with each of a plurality of storage volumes, wherein the input/output operations associated with a given one of the storage volumes are processed by a corresponding one of a plurality of storage processing nodes in a storage system based on a current mapping of the plurality of storage volumes to respective ones of the plurality of storage processing nodes;
  obtaining a plurality of constraints that limit the input/output operations processed by at least a subset of the storage processing nodes in the storage system, wherein the plurality of constraints comprise one or more of: (i) a percentage of read operations, of the read operations processed by the plurality of storage processing nodes, within the period of time processed by a given storage processing node of the plurality of storage processing nodes in the storage system, (ii) a percentage of write operations, of the write operations processed by the plurality of storage processing nodes, within the period of time processed by a given storage processing node of the plurality of storage processing nodes in the storage system, and (iii) a percentage of input/output operations, of the input/output operations processed by the plurality of storage processing nodes, within the period of time processed by a given storage processing node of the plurality of storage processing nodes in the storage system;
  identifying one or more possible mappings of the plurality of storage volumes to respective ones of the plurality of storage processing nodes that satisfy the plurality of constraints; and selecting an alternative mapping of the plurality of storage volumes to respective ones of the plurality of storage processing nodes by applying at least one designated function to at least a subset of the one or more possible mappings, wherein the at least one designated function comprises at least one logical function that is applied for each of one or more of the storage volumes to determine a number of storage volumes that are mapped to a different storage processing node in the alternative mapping;

wherein the method is performed by at least one processing device comprising a processor coupled to a memory.

2. The method of claim 1, wherein the at least one designated function comprises a cost function that reduces a number of storage volumes that are mapped to a different storage processing node in the alternative mapping.

3. The method of claim 1, wherein the logical function comprises an exclusive or (XOR) function.

4. The method of claim 1, wherein the at least one designated function comprises a cost function that maps the storage volumes to the storage processing nodes in a manner that reduces a difference between a percentage of the total input/output operations processed by at least one storage processing node and a target percentage of the total input/output operations processed by at least one storage processing node.

5. The method of claim 1, wherein the selecting the alternative mapping further comprises applying one or more time-based stopping criteria.

6. The method of claim 1, wherein the input/output operations comprise a plurality of the read operations and a plurality of the write operations, and wherein the plurality of read operations and the plurality of write operations are balanced separately among the storage volumes.

7. The method of claim 6, wherein the plurality of constraints comprises: (i) a first sum of the plurality of read operations being above a lower limit of a total number of read operations and below an upper limit of the total number of read operations, and (ii) a second sum of the plurality of write operations being above a lower limit of a total number of write operations and below an upper limit of the total number of write operations.

8. The method of claim 1, wherein the plurality of constraints that limit the input/output operations processed by each storage processing node comprises a permissible percentage range of the input/output operations processed by each storage processing node.

9. The method of claim 1, further comprising associating the plurality of storage volumes to the respective ones of the plurality of storage processing nodes using the alternative mapping.

10. An apparatus comprising:
at least one processing device comprising a processor coupled to a memory;
the at least one processing device being configured to implement the following steps:
determining a number of input/output operations for a period of time associated with each of a plurality of storage volumes, wherein the input/output operations associated with a given one of the storage volumes are processed by a corresponding one of a plurality of storage processing nodes in a storage system based on a current mapping of the plurality of storage volumes to respective ones of the plurality of storage processing nodes;

obtaining a plurality of constraints that limit the input/output operations processed by at least a subset of the storage processing nodes in the storage system, wherein the plurality of constraints comprise one or more of: (i) a percentage of read operations, of the read operations processed by the plurality of storage processing nodes, within the period of time processed by a given storage processing node of the plurality of storage processing nodes in the storage system, (ii) a percentage of write operations, of the write operations processed by the plurality of storage processing nodes, within the period of time processed by a given storage processing node of the plurality of storage processing nodes in the storage system, and (iii) a percentage of input/output operations, of the input/output operations processed by the plurality of storage processing nodes, within the period of time processed by a given storage processing node of the plurality of storage processing nodes in the storage system;

identifying one or more possible mappings of the plurality of storage volumes to respective ones of the plurality of storage processing nodes that satisfy the plurality of constraints; and selecting an alternative mapping of the plurality of storage volumes to respective ones of the plurality of storage processing nodes by applying at least one designated function to at least a subset of the one or more possible mappings, wherein the at least one designated function comprises at least one logical function that is applied for each of one or more of the storage volumes to determine a number of storage volumes that are mapped to a different storage processing node in the alternative mapping.

11. The apparatus of claim 10, wherein the at least one designated function comprises a cost function that reduces a number of storage volumes that are mapped to a different storage processing node in the alternative mapping, and wherein the logical function comprises an exclusive or (XOR) function.

12. The apparatus of claim 10, wherein the at least one designated function comprises a cost function that maps the storage volumes to the storage processing nodes in a manner that reduces a difference between a percentage of the total input/output operations processed by at least one storage processing node and a target percentage of the total input/output operations processed by at least one storage processing node.

13. The apparatus of claim 10, wherein the input/output operations comprise a plurality of the read operations and a plurality of the write operations, and wherein the plurality of read operations and the plurality of write operations are balanced separately among the storage volumes.

14. The apparatus of claim 10, wherein the plurality of constraints that limit the input/output operations processed by each storage processing node comprises a permissible percentage range of the input/output operations processed by each storage processing node.

15. The apparatus of claim 10, further comprising associating the plurality of storage volumes to the respective ones of the plurality of storage processing nodes using the alternative mapping.

16. A non-transitory processor-readable storage medium having stored therein program code of one or more software programs, wherein the program code when executed by at least one processing device causes the at least one processing device to perform the following steps:

determining a number of input/output operations for a period of time associated with each of a plurality of storage volumes, wherein the input/output operations associated with a given one of the storage volumes are processed by a corresponding one of a plurality of storage processing nodes in a storage system based on a current mapping of the plurality of storage volumes to respective ones of the plurality of storage processing nodes;

obtaining a plurality of constraints that limit the input/output operations processed by at least a subset of the storage processing nodes in the storage system, wherein the plurality of constraints comprise one or more of: (i) a percentage of read operations, of the read operations processed by the plurality of storage processing nodes, within the period of time processed by a given storage processing node of the plurality of storage processing nodes in the storage system, (ii) a percentage of write operations, of the write operations processed by the plurality of storage processing nodes, within the period of time processed by a given storage processing node of the plurality of storage processing nodes in the storage system, and (iii) a percentage of input/output operations, of the input/output operations processed by the plurality of storage processing nodes, within the period of time processed by a given storage processing node of the plurality of storage processing nodes in the storage system;

identifying one or more possible mappings of the plurality of storage volumes to respective ones of the plurality of storage processing nodes that satisfy the plurality of constraints; and selecting an alternative mapping of the plurality of storage volumes to respective ones of the plurality of storage processing nodes by applying at least one designated function to at least a subset of the one or more possible mappings, wherein the at least one designated function comprises at least one logical function that is applied for each of one or more of the storage volumes to determine a number of storage volumes that are mapped to a different storage processing node in the alternative mapping.

17. The non-transitory processor-readable storage medium of claim 16, wherein the at least one designated function comprises a cost function that reduces a number of storage volumes that are mapped to a different storage processing node in the alternative mapping, and wherein the logical function comprises an exclusive or (XOR) function.

18. The non-transitory processor-readable storage medium of claim 16, wherein the at least one designated function comprises a cost function that maps the storage volumes to the storage processing nodes in a manner that reduces a difference between a percentage of the total input/output operations processed by at least one storage processing node and a target percentage of the total input/output operations processed by at least one storage processing node.

19. The non-transitory processor-readable storage medium of claim 16, wherein the input/output operations comprise a plurality of the read operations and a plurality of the write operations, and wherein the plurality of read operations and the plurality of write operations are balanced separately among the storage volumes.

20. The non-transitory processor-readable storage medium of claim 16, wherein the plurality of constraints that limit the input/output operations processed by each storage processing node comprises a permissible percentage range of the input/output operations processed by each storage processing node.

* * * * *